United States Patent

Houlihan

[15] 3,674,882
[45] July 4, 1972

[54] DICHLORO TRIFLUOROMETHYL PHENYL LITHIUM

[72] Inventor: William J. Houlihan, Mountain Lakes, N.J.
[73] Assignee: Sandoz-Wander, Inc., Hanover, N.J.
[22] Filed: Jan. 21, 1971
[21] Appl. No.: 108,640

Related U.S. Application Data

[63] Continuation-in-part of Ser. No. 816,084, April 14, 1969, Pat. No. 3,592,842, which is a continuation-in-part of Ser. No. 729,944, May 17, 1968, abandoned.

[52] U.S. Cl. ......................... 260/665 R, 71/115, 260/515 A, 260/651 F, 424/317
[51] Int. Cl. ........................................... C07f 1/02, B21d 3/02
[58] Field of Search ................................ 260/665 R, 651 F

[56] References Cited

UNITED STATES PATENTS 3,489,784  1/1970  Fellig et al. ........................ 260/651 F
3,514,436  5/1970  Trepka et al. ...................... 260/665 F

OTHER PUBLICATIONS

Hudlicky, Chemistry of Organic Fluorine Compounds, MacMillan Co., N.Y., N.Y., 1962, pp. 222–225.

*Primary Examiner*—Tobias E. Levow
*Assistant Examiner*—A. P. Demers
*Attorney*—Gerald D. Sharkin, Frederick H. Weinfeldt, Robert S. Honor, Walter F. Jewell, Richard E. Vila and Thomas O. McGover

[57] ABSTRACT

Dichloro trifluoromethyl phenyl lithium compounds are prepared by reacting a dichloro trifluorotoluene with an alkyl lithium compound and are useful as intermediates in the preparation of dichloro-trifluoromethyl benzoic acids which are CNS depressants and agrochemical agents.

4 Claims, No Drawings

DICHLORO TRIFLUOROMETHYL PHENYL LITHIUM

This application is a continuation-in-part of application Serial No. 816,084, filed Apr. 14, 1969 now U.S. Pat. No. 3,592,842, issued July 13, 1971 which in turn is a continuation-in-part of application Ser. No. 729,944, filed May 17, 1968, now abandoned.

This invention relates to fluoromethyl benzoic acids. More specifically it relates to dichloro trifluoromethyl benzoic acids, basic addition salts thereof such as the sodium or potassium salt, dichloro trifluoromethyl phenyl lithium intermediates therefor, and processes for their preparation.

The benzoic acids of this invention may be represented by the formula

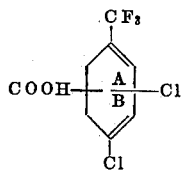

(I)

provided that Cl is restricted to either the A or B position, and when Cl is at A, COOH is at B.

More specifically, the preferred compounds of this invention are 2,6-dichloro-3-trifluoromethyl benzoic acid,

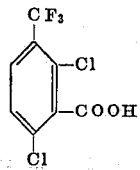

(Ia)

2,3-dichloro-5-trifluoromethyl benzoic acid,

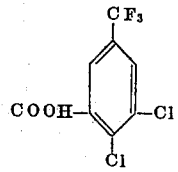

(Ib)

2,3-dichloro-6-trifluoromethyl benzoic acid

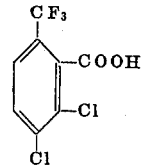

(Ic)

and 3,4-dichloro-6-trifluoromethyl benzoic acid

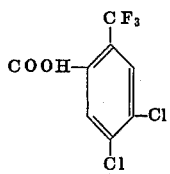

(Id)

The process for preparing the compounds of formula (I) may be represented by the following reaction scheme:

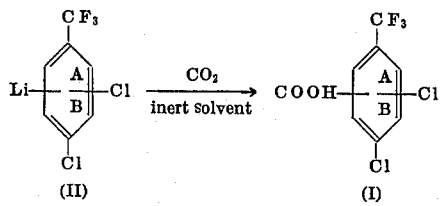

where Cl is restricted to either the A or B position; and when Cl is at A, Li and COOH are at B.

Compounds (I) are prepared by treating in an inert solvent a corresponding lithium intermediate compound of formula (II) with carbon dioxide. The reaction may be conveniently carried out at a temperature of from −50° to 35° C. and preferably at a temperature of −10° to 10° C. The carbon dioxide used can be a solid or gas. The solvent may be lower hydrocarbons such as pentane, hexane, heptane and the like, ethers such as diethyl ether, dibutyl ether and the like, tetrahydrofuran and benzene.

The process for preparing compound (II) may be represented by the following reaction scheme:

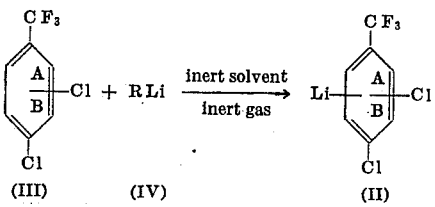

where Cl and Li have the above-stated restrictions, and R is a straight chain lower alkyl having one to six carbon atoms.

The intermediate lithium compound (II) may be prepared by reacting a dichloro-trifluorotoluene with a straight chain lower alkyl lithium compound (IV) having one to six carbon atoms in a solvent in the presence of an inert gas. The preferred alkyl lithium compound is butyl lithium. The solvent may be lower hydrocarbons such as pentane, hexane, heptane, and the like, ethers such as diethyl ether, dibutyl ether, and the like, tetrahydrofuran and benzene. The inert gas may be nitrogen, helium, argon, and the like. The reaction conveniently takes place at temperatures of −60° to −30° C. with the preferred temperature range being −50° to −40° C.

When the starting material of formula III is 2,4-dichloro-α,α,α-trifluorotoluene,

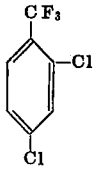

(V)

the lithium intermediate is 2,6-dichloro-3-trifluoromethyl-phenyl lithium having the structural formula

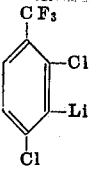

(VI)

When the starting material of formula III is 3,4-dichloro-α,α,α-trifluorotoluene,

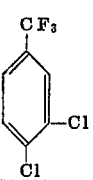

(VII)

the lithium intermediate can be represented by the structural formula

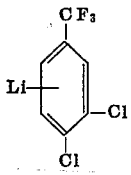

(VIII)

Using the reaction described above for compound (I), compounds (Ia), (Ib), (Ic) and (Id) can be prepared. When 2,4- dichloro-α,α,α-trifluorotoluene (V) is the starting material, the 2,6-dichloro-3-trifluoromethyl benzoic acid (Ia) is obtained. Starting with 3,4-dichloro-α,α,α-trifluorotoluene (VII) a mixture of the 2,3-dichloro-5-trifluoromethyl benzoic acid (Ib), 2,3-dichloro-6-trifluoromethyl benzoic acid (Ic) and 3,4-dichloro-6-trifluoromethyl benzoic acid (Id) is obtained with the 2,3-dichloro-5-trifluoromethyl benzoic acid (Ib) predominating. Conventional recovery techniques are utilized for obtaining the products (Ia), (Ib), (Ic) and (Id).

These acids may be converted to and from the basic addition using using conventional techniques, such as suspending or dissolving the acid in water and treating the resulting material with a base, such as sodium hydroxide.

The compounds of formula (III) are known and are prepared by methods disclosed in the literature.

The trifluoromethyl benzoic acids represented by formula (I) above, and their non-toxic basic addition salts, are useful because they possess pharmacological properties in animals, such as mammals. In particular, these compounds are useful as CNS depressants as indicated by their activity in mice given a 200 mg/kg of active agent and tested according to the 30-word adjective check sheet system basically described by Irwin S. (Gordon Research Conference, Medicinal Chemistry, 1959) and Chen (Symposium on Sedative and Hypnotic Drugs, Williams and Wilkins, 1954).

These trifluoromethyl benzoic acids or their salts may be combined with a pharmaceutically acceptable carrier or adjuvant. They may be administered orally or parenterally. For this use, the dosage will vary depending upon the mode of administration utilized and the particular compound employed. However, in general, satisfactory results are obtained when the compounds are administered at a daily dosage of from about 5 milligrams to 200 milligrams per kilogram of animal body weight. This daily dosage is preferably given in divided doses, e.g., 2 to 4 times a day, or in sustained release form. For most large mammals, the total daily dosage is from about 250 to 750 milligrams, and dosage forms suitable for internal administration comprise from about 60 milligrams to about 375 milligrams of the compound in admixture with a solid or liquid pharmaceutical carrier or diluent.

A representative formulation suitable for oral administration is a tablet prepared by standard tabletting techniques which contains the following:

| Ingredient | Parts by Weight |
| --- | --- |
| 2,6-dichloro-3-trifluoromethyl benzoic acid | 25 |
| Tragacanth | 2 |
| Lactose | 64.5 |
| Corn Starch | 5 |
| Talcum | 3 |
| Magnesium Stearate | 0.5 |

The compounds of this invention are also useful as agrochemical agents, particularly as plant growth regulators and as herbicides and may be used for controlling the growth of plants or for the destruction or prevention of weeds or unwanted plants.

They may be used as such on their own or preferably in combination with an agriculturally or herbicidally acceptable diluent or carrier.

The compounds of the formula (I) in the form of free acids or as agriculturally or herbicidally acceptable basic addition salts may be worked up to give herbicidal compositions of which the exact nature may vary greatly depending on the intended use. These compositions may be worked up in the usual way, if desired with the addition of adjuvants, to give preparations which may be used in the form of solutions, emulsions, suspensions, pastes, powders, strewing agents, dusting agents and granulates, if desired after further dilution. Liquors for application in the control of plant growth should contain at least 0.02 and preferably up to about 1 percent of an active agent of this invention. It is also within the scope of the present invention to incorporate into these herbicidal compositions adjuvants which facilitate distribution and increase the adhesion and stability to rain.

Depending on the purpose for which the preparation is to be used, it is possible to add other materials having an influence on plant growth, for example in order to widen the effect spectrum.

Herbicidal preparations containing a compound of this invention may be used in conventional manner, e.g. (a) by emulsification or suspension of the preparation in water and spraying the plants to be treated, for example by sprinkling or spraying a locus to be cultivated or protected before the germination of any weeds, (b) by dusting already existing weeds, or (c) by direct application of a dusting or strewing agent or granulate to the locus to be cultivated. If desired, the preparation may also be worked into the ground.

The compounds of formula (I) may be applied at a dosage of 2–30 pounds per acre to produce a satisfactory herbicidal effect. An appropriate non-selective dosage is 10–30 pounds per acre whereas a dosage suitable for selective herbicidal action is 2–10 pounds per acre.

The invention is illustrated, but in no way limited, by reference to the following examples.

EXAMPLE 1

2,6-dichloro-3-trifluoromethyl benzoic acid

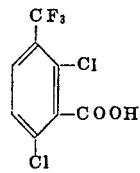

170 g (0.79 mole) of 2,4-dichloro-α,α,α-trifluorotoluene and 1,000 ml of absolute tetrahydrofuran were charged to a flask equipped with stirrer, dropping funnel, carbon dioxide condenser and gas inlet tube. The system was flushed with dry nitrogen and cooled (carbon dioxide-acetone bath) to an internal temperature of −50° C. A 660 ml solution of 15 percent n-butyllithium (1.06 mole n-butyllithium) in hexane was added dropwise (20 minutes) to the flask. The resulting dark red-purple solution containing 2,6-dichloro-3-trifluoromethyl phenyl lithium was maintained at −50° C. for about 1 hour, and then poured onto a slurry of 750 g powdered carbon dioxide and 250 ml diethyl ether. After standing for about 20 hours at room temperature, the residue was treated with 750 ml. of 2N sodium hydroxide. The caustic layer was washed with toluene, acidified with concentrated HCl, extracted twice with 200 ml of methylene chloride and dried with sodium sulfate. The methylene chloride layer was filtered and the solvent removed in vacuo. The residue was crystallized from heptane to give 2,6-dichloro-3-trifluoromethyl benzoic acid; m.p. 90°–92 C.

EXAMPLE 2

2,3 dichloro-5-trifluoromethyl benzoic acid

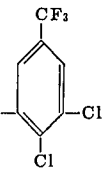

2,3-dichloro-6-trifluoromethyl benzoic acid

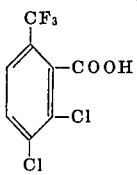

3,4-dichloro-6-trifluoromethyl benzoic acid

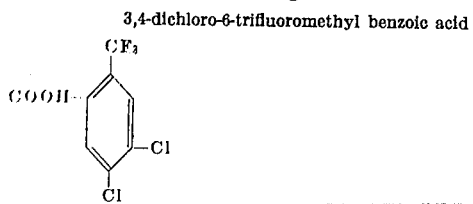

56.5 g (0.263 mole) of 3,4-dichloro-α,α,α-trifluorotoluene and 500 ml of absolute tetrahydrofuran were charged to a flask equipped with stirrer, dropping funnel, carbon dioxide, condenser and gas inlet tube. The system was flushed with dry nitrogen and cooled (carbon dioxide-acetone bath) to an internal temperature of −50° C. A 220 ml solution of 15 percent n-butyllithium (0.352 mole) in hexane was added dropwise (20 minutes to the flask). The resulting dark red-purple solution containing the phenyl lithium intermediates of formula VIII above was maintained at −50°C. for about 1 hour, and then poured onto a slurry of 350 g powdered carbon dioxide and 150 g diethyl ether. After standing for about 20 hours at room temperature the residue was treated with 300 ml of 2N sodium hydroxide. The caustic layer was washed with toluene, acidified with concentrated HCl, extracted twice with 200 ml of methylene chloride and dried with sodium sulfate. The methylene chloride layer was filtered and the solvent removed in vacuo. The residue was crystallized from heptane to give mainly a mixture of 2,3-dichloro-3-trifluoromethyl benzoic acid, 2,3-dichloro-6-trifluoromethyl benzoic acid, and 3,4-dichloro-6-trifluoromethyl benzoic acid.

EXAMPLE 3

A test tube having a ¼ inch hole at the bottom is plugged at the hole with some glass wool. The test tube is then filled to about 1½ inches from the top with quartz sand which is made inert by washing with acetone-distilled water (1:1), distilled water, and dried. Seed of the plant to be tested is planted in the sand. The tube is fitted with a rubber collar and suspended in an Erlenmeyer flask containing conventional KNOPS nutrient solution and the active agent of this invention at a concentration of 50 parts per million (no active agent in check). The apparatus is placed under fluorescent lights for about three weeks and once daily, the bottom of the tube is dipped into the solution. The results are noted below when 2,6-dichloro-3-trifluoromethyl benzoic acid is used as active agent:

| Test species | Plant/seeds | Height | Root length | Comments |
|---|---|---|---|---|
| Field corn No. 8 | 2/4 | 6 | 17 | Extreme epinasty, then death; roots extremely stunted and extremely discolored. |
| Annual ryegrass | 2/4 | 8 | 9 | Extreme epinasty and much necrosis, then death; roots extremely sparse and extremely stunted. |
| Barnyard grass | 4/4 | 9 | 29 | Extreme epinasty, then death; roots extremely sparse and extremely stunted. |
| Wild oat | 0/4 | 0 | 0 | No germination. |
| Johnsongrass | 0/4 | 0 | 0 | Do. |
| Wheat (red coat) | 3/4 | 4 | 3 | Extreme epinasty, then death; roots extremely sparse and extremely stunted. |
| Soybean (Adelphia) | 0/4 | 0 | 0 | No germination. |
| Coffeeweed | 0/4 | 0 | 0 | Do. |
| Field bindweed | 0/4 | 0 | 17 | No germination; roots extremely stunted and extremely discolored. |
| Redroot pigweed | 6/8 | 15 | 7 | Extreme epinasty, then death; roots extremely stunted. |
| Cocklebur | 0/1 | 0 | 8 | No germination; roots extremely stunted and extremely discolored. |
| Cotton (Coker 201) | 0/4 | 0 | 22 | Do. |

EXAMPLE 4

Using the procedure outlined in Example 3 and 2,3-dichloro-5-trifluoromethyl benzoic acid as the active agent, the following results are obtained:

| Test species | Plant/seeds | Height | Root length | Comments |
|---|---|---|---|---|
| Field Corn No. 8 | 4/4 | 47 | 22 | Chlorosis and much epinasty, then death; roots stunted and extremely discolored. |
| Annual ryegrass | 4/4 | 75 | 69 | Very slight necrosis. |
| Barnyard grass | 3/4 | 88 | 48 | Very slight chlorosis; roots stunted. |
| Wild oat | 1/4 | 56 | 100 | Very slight epinasty. |
| Johnsongrass | 3/4 | 67 | 110 | Do. |
| Wheat (Red Coat) | 3/4 | 49 | 83 | Minor epinasty. |
| Soybean (Adelphia) | 4/4 | 22 | 75 | Extreme epinasty. |
| Coffeeweed | 4/4 | 60 | 100 | Epinasty; roots sparse. |
| Field bindweed | 3/4 | 11 | 50 | Much epinasty; roots extremely stunted and extremely sparse. |
| Redroot pigweed | 5/8 | 15 | 14 | Chlorosis and epinasty, then death; roots extremely stunted. |
| Cocklebur | 1/1 | 39 | 21 | Much epinasty, then death; roots greatly stunted. |
| Cotton (Coker 201) | 4/4 | 53 | 111 | Epinasty, then death, possibly due to fungal attack; roots extremely sparse. |

EXAMPLE 5

Dust Formulations

The following compositions are adapted for direct application as dusts for the destruction or prevention of weeds using conventional dusting equipment. The dusts are made by blending or mixing the ingredients and grinding the mix to give compositions having an average particle size less than about 50 microns.

| A | Parts |
|---|---|
| 2,6-dichloro-3-trifluoromethyl benzoic acid | 20 |
| Talc | 80 |
| Total: | 100 |

| B | |
|---|---|
| 2,3-dichloro-5-trifluoromethyl benzoic acid | 5 |
| Cottonseed oil | 4 |
| Walnut shell flour | 91 |
| Total: | 100 |

EXAMPLE 6

Water-dispersible Liquid Compositions

The following compositions are in a liquid form and are adapted for addition to water to give aqueous dispersions for application as sprays. The liquid or fluid compositions shown are prepared by thoroughly mixing and dispersing active compounds and conditioning agent or agents in an organic liquid diluent.

| A | Parts |
|---|---|
| 2,3-dichloro-6-trifluoromethyl benzoic acid | 25 |
| Long chain fatty alcohol sulfate (emulsifying agent) | 2 |
| Goulac (dispersing agent) | 3 |
| Kerosene | 70 |
| Total: | 100 |

| B | |
|---|---|
| 3,4-dichloro-6-trifluoromethyl benzoic acid | 30 |
| Alkylated aryl polyether alcohol (wetting and emulsifying agent) | 3 |
| Methyl cellulose (dispersing agent) | 1 |
| Kerosene | 66 |
| Total: | 100 |

What is claimed is:
1. A compound of the formula

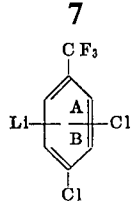

wherein Cl is in the A or B position, and when Cl is at A, Li is at B.

2. A compound according to claim 1 of the formula

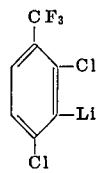

3. A compound according to claim 1 of the formula

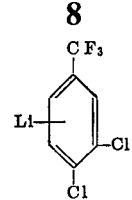

4. A process for the preparation of the compound of claim 1 which comprises treating in the presence of an inert gas and an inert solvent at a temperature of $-60°$ to $-30°$ C. a compound of the formula

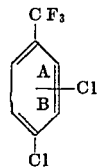

where Cl is in the A or B position, with a compound of the formula

RLi wherein R is straight chain lower alkyl.

* * * * *